(12) United States Patent
Basulto et al.

(10) Patent No.: US 10,936,021 B1
(45) Date of Patent: Mar. 2, 2021

(54) ADJUSTABLE RECEPTACLE FOR TABLET DEVICE

(71) Applicant: iOgrapher, LLC, San Gabriel, CA (US)

(72) Inventors: Loren Basulto, San Gabriel, CA (US); Dale Woiken, Upland, CA (US)

(73) Assignee: iOgrapher, LLC, San Gabriel, CA (US)

( * ) Notice: Subject to any disclaimer, the term of this patent is extended or adjusted under 35 U.S.C. 154(b) by 0 days.

(21) Appl. No.: 16/732,164

(22) Filed: Dec. 31, 2019

(51) Int. Cl.
*G06F 1/16* (2006.01)

(52) U.S. Cl.
CPC .......... *G06F 1/1681* (2013.01); *G06F 1/1626* (2013.01); *G06F 1/1679* (2013.01); *G06F 2200/1633* (2013.01)

(58) Field of Classification Search
CPC ............................. F16M 11/04; G06F 1/1632
USPC .............. 361/679.01, 679.02, 679.3, 679.32, 361/679.55–679.59
See application file for complete search history.

(56) References Cited

U.S. PATENT DOCUMENTS

| | | | | |
|---|---|---|---|---|
| 5,457,745 A * | 10/1995 | Wang | ................. | B60R 11/0241 379/426 |
| 5,903,645 A * | 5/1999 | Tsay | ................... | B60R 11/0241 248/316.4 |
| 7,551,458 B2 * | 6/2009 | Carnevali | ........... | B60R 11/0252 174/520 |
| 8,007,188 B2 * | 8/2011 | Orf | ........................ | H04M 1/04 396/419 |
| 8,646,736 B2 * | 2/2014 | Berry | ...................... | H04M 1/04 248/121 |
| 8,833,716 B2 * | 9/2014 | Funk | .................... | F16M 13/022 248/316.4 |
| 8,885,337 B2 * | 11/2014 | Schanz | ............... | B60R 11/0258 361/679.58 |
| 8,985,333 B1 * | 3/2015 | Clementi | ............... | F16M 13/00 206/476 |
| 9,386,194 B2 * | 7/2016 | Basulto | ............... | H04N 5/2251 |
| 9,400,078 B1 * | 7/2016 | McGowan | ............ | F16M 13/04 |
| 9,609,186 B2 * | 3/2017 | Basulto | ............... | H04N 5/2252 |
| 9,727,085 B2 * | 8/2017 | Weldon | ................ | G06F 1/1684 |
| 9,772,543 B2 * | 9/2017 | Basulto | ............... | G03B 17/561 |
| 9,776,577 B2 * | 10/2017 | Carnevali | ............ | F16M 11/041 |
| 9,797,543 B2 * | 10/2017 | Lin | ..................... | E05B 73/0082 |
| 10,082,727 B2 * | 9/2018 | Basulto | ............... | G03B 17/563 |

(Continued)

*Primary Examiner* — Anthony Q Edwards
(74) *Attorney, Agent, or Firm* — Patent Ingenuity, P.C.; Samuel K. Simpson (57) ABSTRACT

A receptacle apparatus has a top-side surface, bottom-side surface, right-side surface, and left-side surface. Additionally, the top-side surface has an upward protruding flange. Furthermore, the receptacle apparatus has a top-side gripping member, bottom-side gripping member, right-side gripping member, and left-side gripping member. The top-side gripping member is operably attached to the upward protruding flange, and is configured to grip a first portion of a tablet device to the receptacle apparatus. Moreover, the bottom-side gripping member is configured to grip a second portion of the tablet device to the receptacle apparatus. Also, the right-side gripping member is configured to grip a third portion of the tablet device to the receptacle apparatus. Finally, the left-side gripping member is configured to grip a fourth portion of the tablet device to the receptacle device.

12 Claims, 11 Drawing Sheets

(56) References Cited

U.S. PATENT DOCUMENTS

| | | | | |
|---|---|---|---|---|
| 10,175,723 | B2 * | 1/2019 | Weldon | G06F 1/1696 |
| 10,627,706 | B2 * | 4/2020 | Basulto | G03B 17/565 |
| 2011/0069947 | A1 * | 3/2011 | Orf | H04M 1/04 |
| | | | | 396/419 |
| 2012/0075801 | A1 * | 3/2012 | Yang | G06F 1/1656 |
| | | | | 361/679.59 |
| 2012/0224318 | A1 * | 9/2012 | Carleton | G06F 1/1628 |
| | | | | 361/679.26 |
| 2012/0275025 | A1 * | 11/2012 | Parrill | A45C 11/00 |
| | | | | 359/511 |
| 2013/0094846 | A1 * | 4/2013 | Apter | F16M 11/242 |
| | | | | 396/419 |
| 2013/0113229 | A1 * | 5/2013 | Wu | A45F 5/10 |
| | | | | 294/138 |
| 2013/0120258 | A1 * | 5/2013 | Maus | A63F 13/98 |
| | | | | 345/161 |
| 2013/0148273 | A1 * | 6/2013 | Tsai | H04M 1/04 |
| | | | | 361/679.01 |
| 2013/0170823 | A1 * | 7/2013 | McDonald | G03B 17/566 |
| | | | | 396/428 |
| 2013/0206942 | A1 * | 8/2013 | Trotsky | F16M 13/00 |
| | | | | 248/274.1 |
| 2014/0204529 | A1 * | 7/2014 | White | E05B 73/0082 |
| | | | | 361/679.55 |

* cited by examiner

ADJUSTABLE RECEPTACLE FOR TABLET DEVICE

BACKGROUND

1. Field

This disclosure generally relates to the field of image capture. More particularly, the disclosure relates to receptacles for mobile computing devices.

2. General Background

Recent advances have transformed the way in which photography is performed. Rather than using standard cameras to take photographs, photographers currently have the convenience of using their mobile computing devices (e.g., tablet device, smartphone, etc.), with which they perform a variety of different activities, to perform image capture.

Yet, in contrast with a standard camera by which a user would gaze through a lens of a camera at close proximity, while being able to grip the majority of the remainder of the camera, the user of a mobile computing device typically has less gripping room that does not interfere with the gaze of the user. For example, the display screen of a tablet device typically encompasses the vast majority of the tablet device. As a result, a user's hands will typically occlude portions of the display screen while the user is holding mobile computing device during image capture; such occlusion interferes with the user's ability to view the entirety of a scene through the mobile computing device, potentially leading to image capture errors or less-than-ideal images.

Moreover, typical receptacle configurations are fitted for dimensions of a particularly-sized tablet device. With rapid changes in tablet device products occurring with substantial frequency, the dimensions of tablet devices have also been changing with substantial frequency as well. A receptacle that may hold one type of tablet device may be rendered useless for holding a newer version of that tablet device, which may be too large or too small to form-fit within the receptacle.

And even if a newer version of a tablet device has the same dimensions as a previous version, the placement of the image capture device within the tablet device may have shifted. For example, a new version of a tablet device may have a camera positioned three inches horizontally inward from a left side of a rear portion of the tablet device, whereas an older version of the tablet device may have the camera positioned two inches horizontally inward from the left side. Given that the receptacle may have had an aperture positioned at two inches horizontally inward from the left side, it would not be popery aligned with the camera of the newer version of the tablet device, thereby leading to a non-aperture portion of the receptacle occluding the camera during image capture; such a result negatively impacts image capture performed by a user, since all, or part, of the captured image will be occluded.

To complicate matters further, some newer tablet devices have a different quantity of image capture devices than a previous version. For example, a newer version of a tablet device may have three cameras, whereas a previous version may have had only one. As a result, current receptacles with one aperture for a camera in a previous version of a tablet device cannot adequately accommodate tablet devices with multiple cameras, which would typically be occluded by non-aperture portions of current receptacles.

Accordingly, use of current receptacles potentially leads to multiple forms of occlusion (e.g., display device occlusion and/or image capture device occlusion) that negatively hinder image capture quality.

SUMMARY

In one embodiment, a receptacle apparatus is provided. The receptacle apparatus has a top-side surface, bottom-side surface, right-side surface, and left-side surface. Additionally, the top-side surface has an upward protruding flange.

Furthermore, the receptacle apparatus has a top-side gripping member, bottom-side gripping member, right-side gripping member, and left-side gripping member. The top-side gripping member is operably attached to the upward protruding flange, and is configured to grip a first portion of a tablet device to the receptacle apparatus. Moreover, the bottom-side gripping member is configured to grip a second portion of the tablet device to the receptacle apparatus. Also, the right-side gripping member is configured to grip a third portion of the tablet device to the receptacle apparatus. Finally, the left-side gripping member is configured to grip a fourth portion of the tablet device to the receptacle device.

In an alternative embodiment, less than all of the foregoing gripping members are utilized in conjunction with the receptacle apparatus. For example, a top-side gripping member may be utilized without additional gripping members.

In yet another alternative embodiment, the receptacle apparatus may configured to fit other types of mobile computing devices besides a tablet device.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

An adjustable receptacle is provided for adhering to a tablet device. In particular, the adjustable receptacle adjusts to the dimensions of a variety of possible tablet devices. Furthermore, the adjustable receptacle adheres to the tablet device in a manner that minimizes movement of the tablet device with respect to the adjustable receptacle, thereby providing added stability during image capture. Additionally, the adjustable receptacle may prevent, or minimize, occlusion of a display screen of the tablet device during image capture and/or occlusion of an image capture device during the image capture.

With respect to avoiding, or minimizing, display screen occlusion, the adjustable receptacle may have one or more sides with sufficient clearance away from the display device. Alternatively, or additionally, the adjustable receptacle may have one or more handles that may be operably attached to, or integrated within, one or more sides, or portions of one or more sides, of the adjustable receptacle; such one or more handles may provide even more clearance away from the display screen to avoid display screen occlusion. As yet another alternative, the adjustable receptacle may have a tripod connection device (e.g., connector or receiver) to connect the adjustable receptacle to a tripod, which also prevents or minimizes display screen occlusion.

Furthermore, with respect to the avoiding, or minimizing, of image capture device occlusion, the adjustable receptacle may have a protruding flange, from which an adjustable gripping member may grip a portion of the tablet device. Given that a tablet device often has one or more cameras positioned in a corner of the tablet device, the protruding flange only makes contact with a central portion of the tablet device, not one or more corners of a given side. As a result, the adjustable receptacle is able to accommodate a variety of different-sized tablet devices with potentially different quantities of image capture devices positioned at different locations of the tablet device, without occlusion of the image capture device. Accordingly, the adjustable receptacle maintains a high quality image capture experience via the tablet device.

Figure 1A:
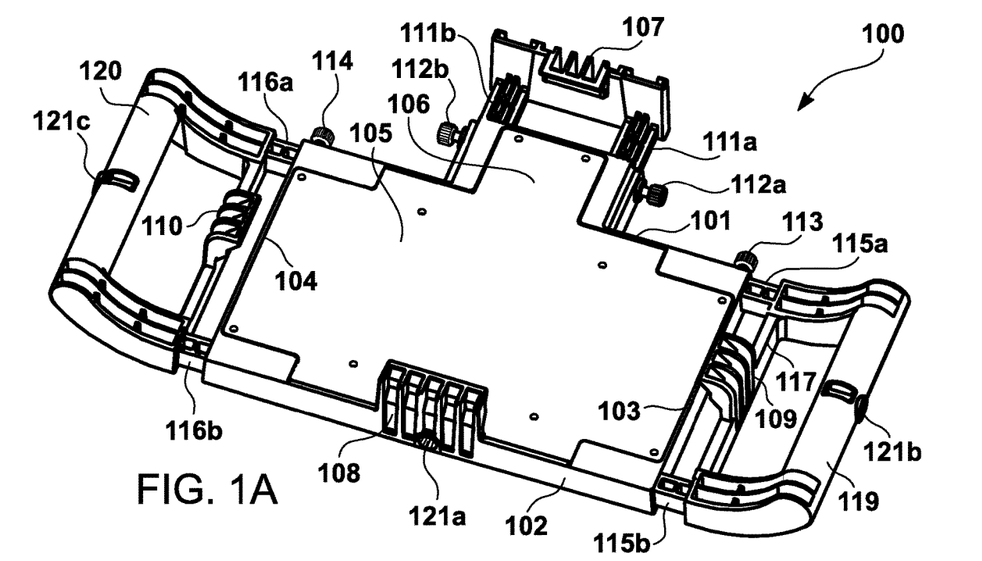
FIG. 1A illustrates a front perspective view of the adjustable receptacle apparatus.
Figure 1B:
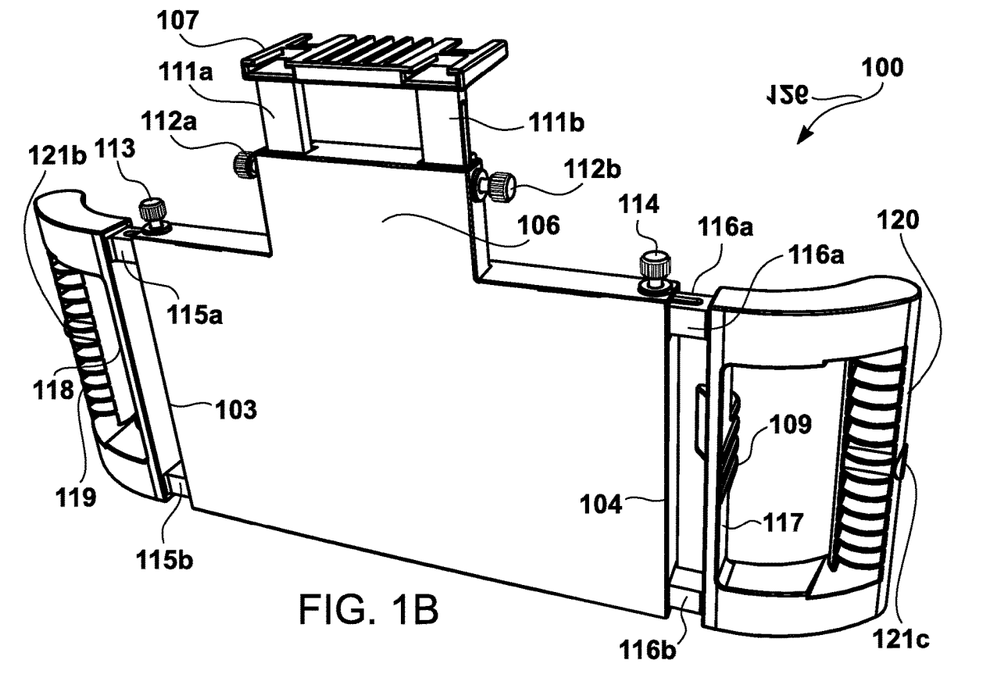
FIG. 1B illustrates a rear perspective view of the adjustable receptacle apparatus illustrated in FIG. 1A.

FIGS. 1A and 1B illustrates various perspective views of an adjustable receptacle apparatus 100. In particular, FIG. 1A illustrates a front perspective view of the adjustable receptacle apparatus 100. More specifically, the adjustable receptacle apparatus 100 may have a plurality of surfaces that form the periphery of the adjustable receptacle apparatus 100, such as a top-side surface 101, a bottom-side surface 102, a right-side surface 103, and a left-side surface 104. In one embodiment, the surfaces 101-104 correspond to sides, or edges, of a base plate 105. In another embodiment, the surfaces 101-104 are attached to the base plate 105. In yet another embodiment, the surfaces 101-104 connect to one another to form a periphery around a full, or partial, cavity.

Furthermore, the top-side surface 101 may have an upward protruding flange 106 that extends upward, away from other portions of the top-side surface 101. For example, the upward protruding flange 106 may extend in a perpendicular manner upwardly away from a central portion of the base plate 105. (The central portion is provided only as an example. The upward protruding flange 106 may extend away from the right portion or the left portion of the base plate 105 instead.) Furthermore, the upward protruding flange 106 may be configured to leave enough space on one or more sides of the upward protruding flange 106 to allow for one or more image capture devices placed at one or more positions of a tablet device to perform unobstructed image capture. In other words, the upward protruding flange 106 may be configured to contact a portion of a tablet device without contacting an image capture device integrated within the tablet device.

Additionally, the adjustable receptacle apparatus 100 may have one or more gripping members that adhere a tablet device to the adjustable receptacle apparatus 100. For example, a top-side gripping member 107 may make contact with an edge of the tablet device to adhere the tablet device to the base plate 105. In one embodiment, the top-side gripping member 107 is extendable from the upward protruding flange. For example, the upward protruding flange 106 may have one more recesses in which one or more flange members 111a and 111b may extend or retract, thereby allowing for adjustment for the top-side gripping member 107 to accommodate different-sized tablet devices. (Although two flange members 111a and 111b are illustrated, more or less flange members may be utilized instead.) Furthermore, in one embodiment, one or more fasteners 112a and 112b (e.g., screws, bolts, screws, knobs, clips, magnets, etc.) may be utilized to tighten the top-side gripping member 107 to the tablet device once an accommodating extension of the top-side gripping member 107 is obtained. (Although two fasteners 112a and 112b are illustrated, more or less fasteners may be utilized instead.) In another embodiment, the top-side gripping member 107 is adjustable via one or hinges. In yet another embodiment, the top-side gripping member 107 is flexible to allow for adjustments without extension/retraction of flange members 111a and 111b.

Moreover, a bottom-side gripping member 108 may be operably attached to, or integrated within, the bottom-side surface 102, a right-side gripping member 109 may be operably attached to, or integrated within, the right-side surface 103, and a left-side gripping member 110 may be operably attached to, or integrated within, the left-side surface 104. In one embodiment, the only extendable gripping member is the top-side gripping member 107; the other gripping members 108-110 are not extended/retracted. In another embodiment, additional or different gripping members are extended/retracted. For example, the right-side gripping member 109 may extend rightward, via right-side members 115a and 115b, from a recess within the right-side surface 103, and may be tightened via a right-side fastener 113. The right-side gripping member 109 may be operably attached to, or integrated within, a right-side extendable portion 117, which may be perpendicularly positioned with respect to the right-side members 115a and 115b. A right handle 119 may be operably attached to, or integrated within, the right-side extendable portion 117 such that the right handle 119 extends/retracts with the right-side extendable portion 117. Further, the left-side gripping member 110 may extend leftward, via left-side members 116a and 116b, from a recess within the left-side surface 104, and may be tightened via a left-side fastener 114. The left-side gripping member 110 may be operably attached to, or integrated within, a left-side extendable portion 118, which may be perpendicularly positioned with respect to the left-side 116a and 116*b*. A left handle 120 may be operably attached to, or integrated within, the left-side extendable portion 118 such that the left handle 120 extends/retracts with the left-side extendable portion 118. (The handles 119 and 120 are illustrated as an optional configuration. Accordingly, the adjustable receptacle apparatus 100 may be fabricated without the handles 119 and 120.)

Furthermore, the adjustable receptacle apparatus 100 may have a tripod connection device 121 that may be used to connect the adjustable receptacle apparatus 100 to a tripod. In one embodiment, the tripod connection device 121*a* is positioned on the bottom-side surface 102. Furthermore, in another embodiment, the tripod connection device 121*a* is positioned within the bottom-side gripping member 108. Alternatively, or in addition, the right handle 119 may have a tripod connection device 121*b* and/or the left handle 120 may have a tripod connection device 121*c*.

In one embodiment, the extraction/retraction of the flange members may be effectuated via one or more springs. In other embodiments, various other mechanisms (e.g., sliding mechanisms, groove mechanisms, etc.) may be utilized in conjunction with, or instead of, the one or more springs.

FIG. 1B illustrates a rear perspective view of the adjustable receptacle apparatus 100 illustrated in FIG. 1A.

Although the adjustable receptacle apparatus 100 is illustrated as being in the shape of a rectangle with a protrusion, other shapes may be used instead. Furthermore, other varieties of gripping members 107-110 (e.g., clamps, clips, etc.) may be utilized other than those illustrated.

Furthermore, the relative position terms of the adjustable receptacle apparatus 100 (e.g., top-side, bottom-side, right-side, and left-side) do not necessarily correspond to relative position terms of the tablet device. For example, what may be considered to be a left side of a tablet device may make contact with the upwardly protruding flange 107 of the top-side surface 101 of the adjustable receptacle apparatus 100. Additionally, the upwardly protruding flange 107 may be used in a different, or additional, position for a different direction. For example, a downwardly protruding flange may be part of the bottom-side surface 102, a rightward protruding flange may be part of the right-side surface 103, and a leftward protruding flange may be part of the left-side surface 104. Accordingly, different, or additional, flanges and extendable gripping members may be utilized as part of the adjustable receptacle apparatus 100.

Finally, although the adjustable receptacle apparatus 100 is discussed herein with respect to a tablet device, it may also be utilized with other computing devices besides a tablet device (e.g., smartphone).

Figure 2:
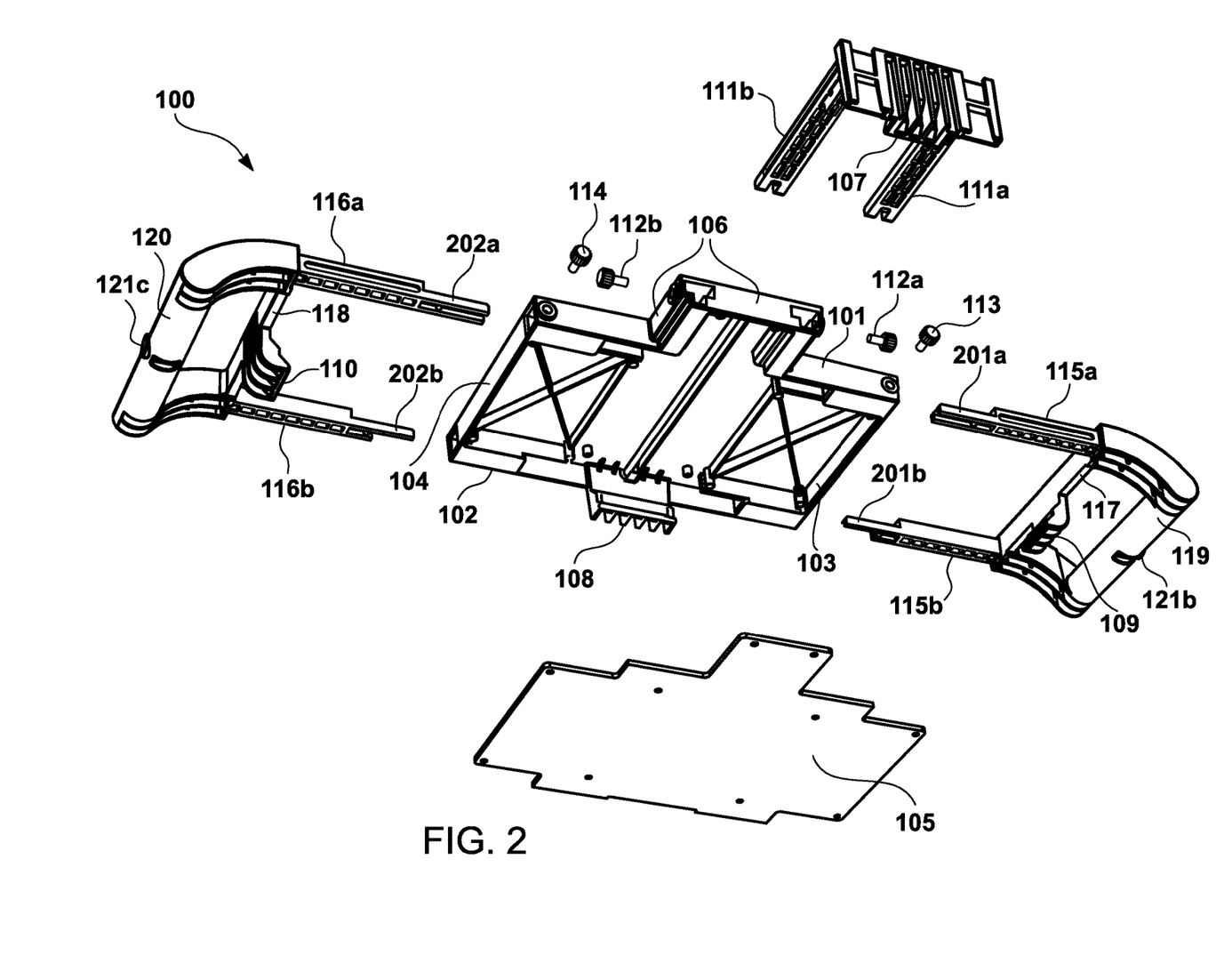
FIG. 2 illustrates a top perspective view of a disassembly of the adjustable receptacle apparatus illustrated in FIGS. 1A and 1B.

FIG. 2 illustrates a top perspective view of a disassembly of the adjustable receptacle apparatus 100 illustrated in FIGS. 1A and 1B. In one embodiment, the adjustable receptacle apparatus 100 is configured with recesses that allow for overlapping members. For example, the right-side members 115*a* and 115*b* may have corresponding slotted portions 201*a* and 201*b* that perpendicularly overlap the flange member 111*a*. Similarly, the left-side members 116*a* and 116*b* may have corresponding sotted portions 202*a* and 202*b* that perpendicularly overlap the flange member 111*b*. The foregoing overlap allows for the adjustable receptacle apparatus 100 to be fabricated in a compact manner, while also allowing maximal extension/retraction of the gripping members 107, 109, and 110. In one embodiment, the bottom-side gripping member 108 does not extend/retract, but rather is fixed.

In one embodiment, a gripping member may be adjusted via a spring mechanism. In various other embodiments, the gripping member may be adjusted via other mechanisms (e.g., pivot mechanism, hinge mechanism, etc.).

Figure 3:
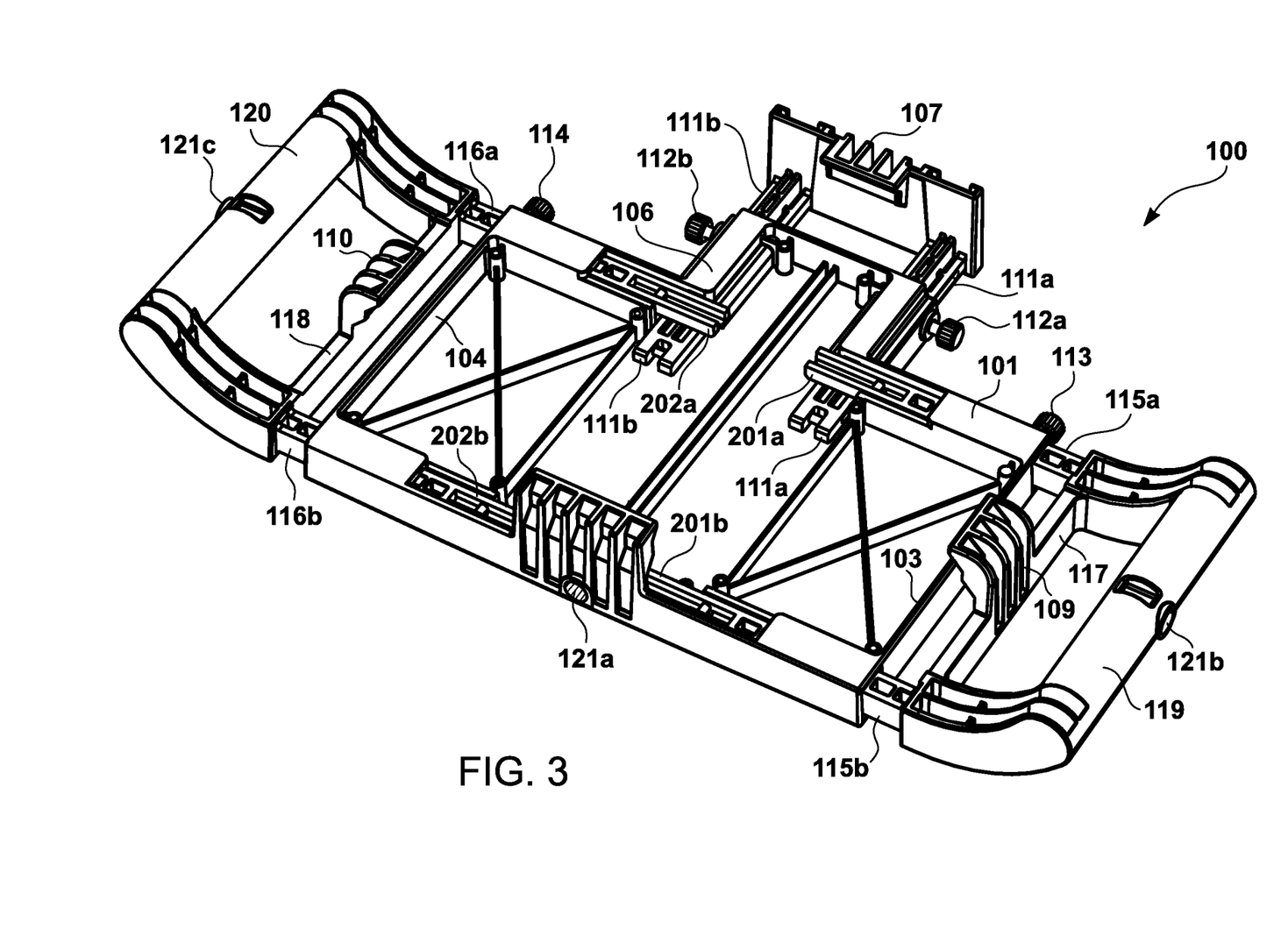
FIG. 3 illustrates a top perspective view of a partial assembly of the adjustable receptacle apparatus illustrated in FIG. 2.

FIG. 3 illustrates a top perspective view of a partial assembly of the adjustable receptacle apparatus 100 illustrated in FIG. 2. In particular, the slotted portion 201*a* is illustrated as overlapping the flange member 111*a*, and the slotted portion 202*a* is illustrated as overlapping the flange member 111*b*. In other embodiments, the overlap may occur in a non-perpendicular manner. Furthermore, in alternative embodiments, no overlap occurs.

Figure 4A:
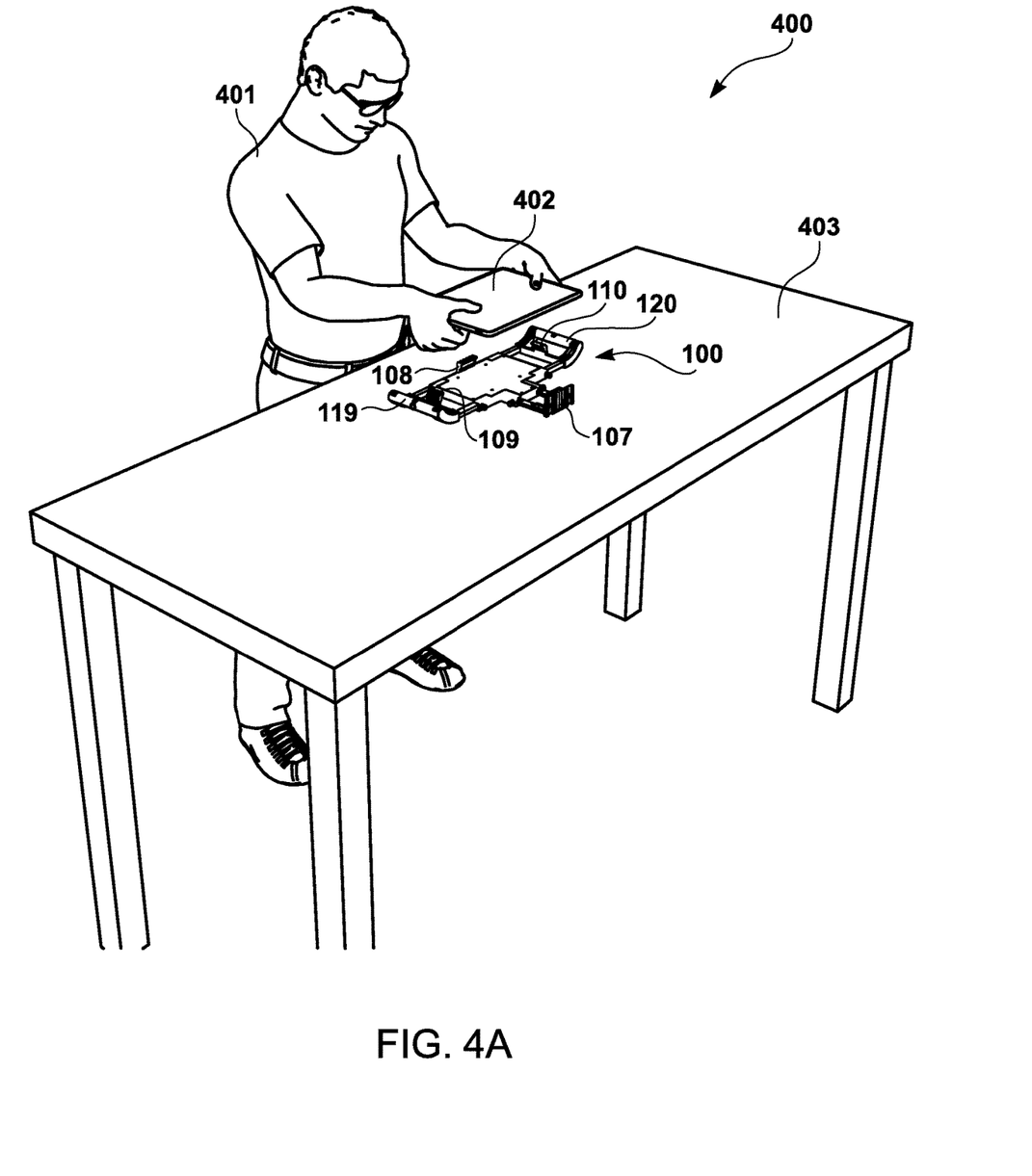
FIG. 4A illustrates a physical environment in which the user has placed the adjustable receptacle apparatus, in extended mode, on a table for fitting of the tablet device.
Figure 4B:
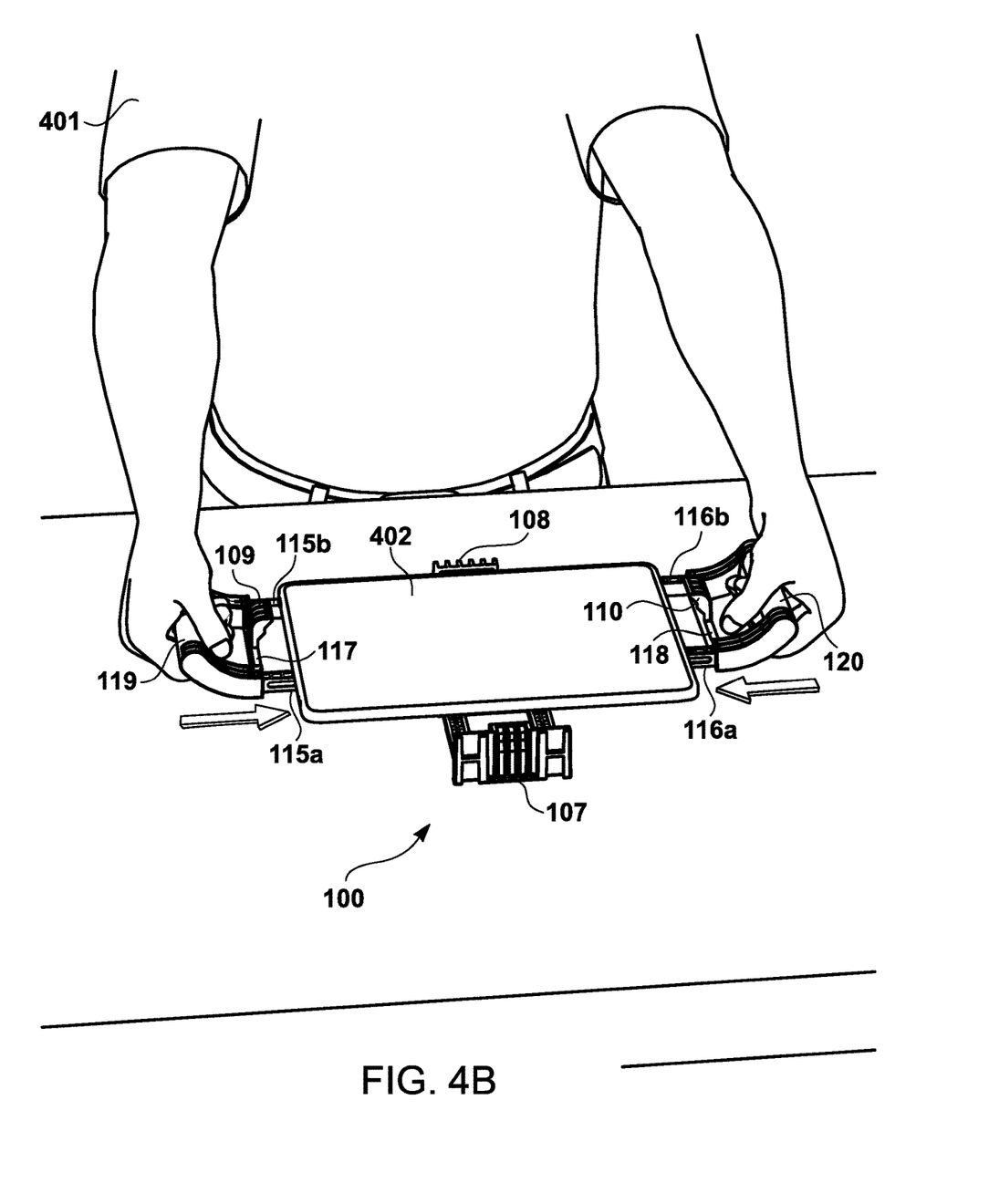
FIG. 4B illustrates the user applying pressure to the handles to retract the corresponding right-side members and the corresponding left-side members to tightly fit the right-side gripping member and the left-side gripping member over the tablet device 402.
Figure 4C:
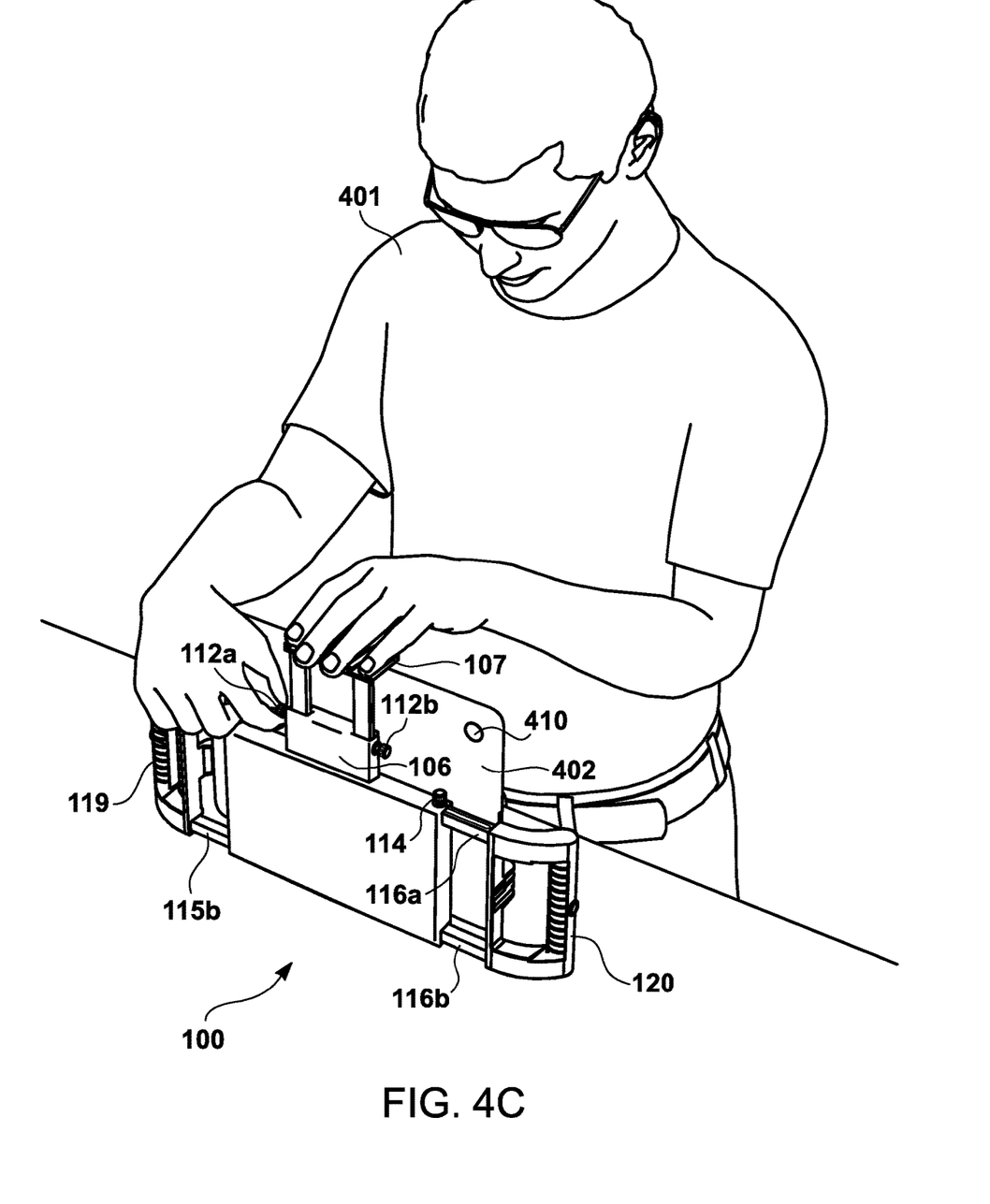
FIG. 4C illustrates the user applying pressure to the top-side gripping member to tightly fit the top-side gripping member over the tablet device.
Figure 4D:
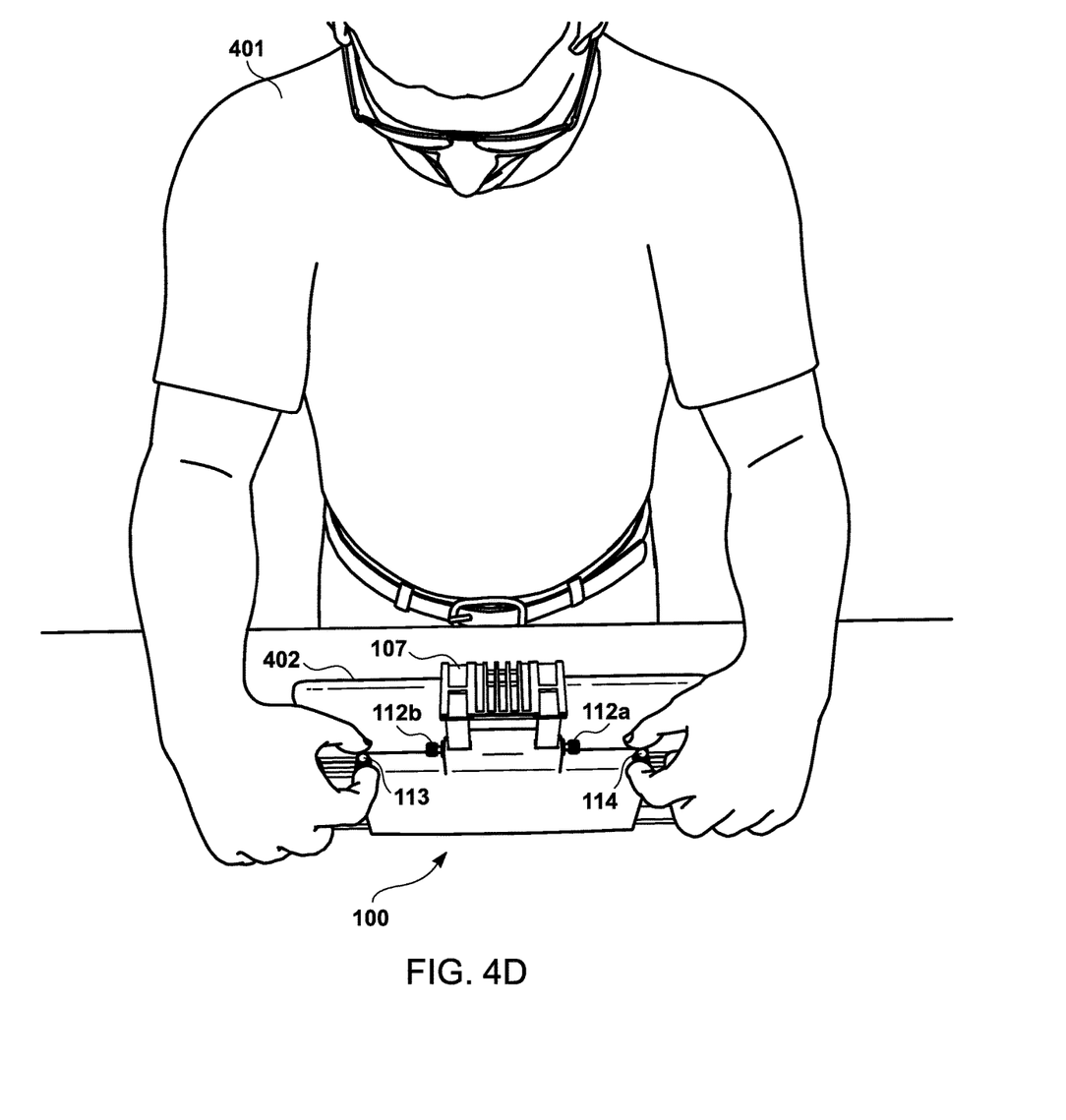
FIG. 4D illustrates the user tightening the fasteners to secure the fit of the right-side gripping member and the left-side gripping member, respectively, over the tablet device.

FIGS. 4A-4D illustrate a user 401 fitting a tablet device 402 within the adjustable receptacle apparatus 100 illustrated in FIGS. 1A and 1B. In particular, FIG. 4A illustrates a physical environment 400 in which the user 401 has placed the adjustable receptacle apparatus 100, in extended mode, on a table 403 for fitting of the tablet device 402. (The table 403 is provided merely as an example; the fitting of the tablet device 402 within the adjustable receptacle apparatus 100 may be performed without the table 403.) Furthermore, FIG. 4B illustrates the user 401 applying pressure to the handles 119 and 120 to retract the corresponding right-side members 115*a* and 115*b* and the corresponding left-side members 116*a* and 116*b* to tightly fit the right-side gripping member 109 and the left-side gripping member 110, respectively, over the tablet device 402. (Although pressure to the handles 119 and 120 is illustrated, the retraction may also be performed via pressure to the other areas of the adjustable receptacle apparatus 100 (e.g., the right-side gripping member 109 and the left-side gripping member 110, the right-side extendable portion 117 and the left-side extendable portion 118, etc.).) In one embodiment, the extraction/retraction of the handles 119 and 120 may be effectuated via one or more springs, or other extraction/retraction mechanism. Additionally, FIG. 4C illustrates the user 401 applying pressure to the top-side gripping member 107 to tightly fit the top-side gripping member 107 over the tablet device 402. Additionally, the user 401 may tighten the fasteners 112*a* and 112*b* to secure the fit of the top-side gripping member 107 over the tablet device 402. Furthermore, an image capture device 410 of the tablet device 402 is illustrated as not making contact with the adjustable receptacle apparatus 100, thereby allowing for unobstructed image capture. Similarly, FIG. 4D illustrates the user 401 tightening the fasteners 113 and 114 to secure the fit of the right-side gripping member 109 and the left-side gripping member 110, respectively, over the tablet device 402.

Figure 5:
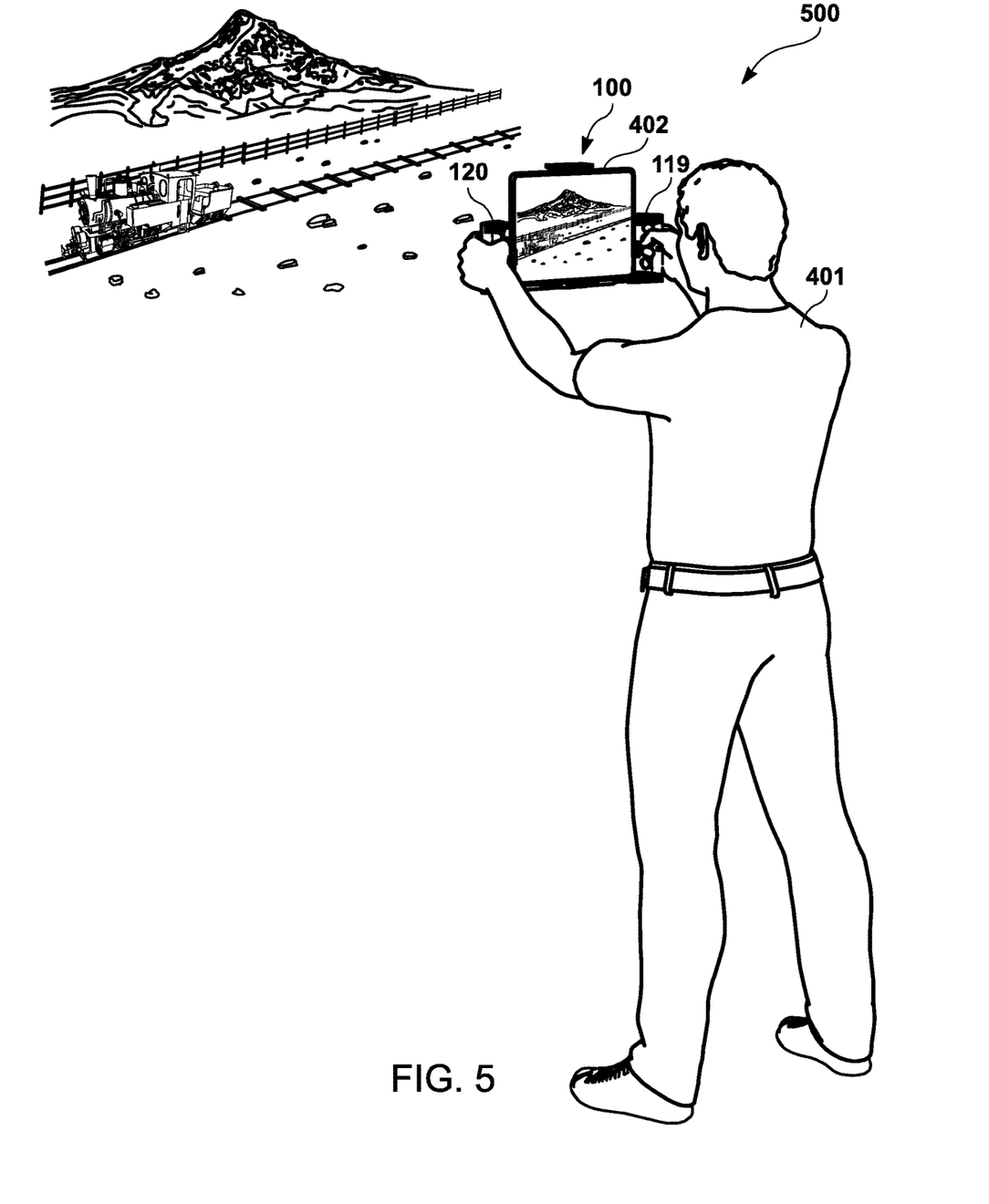
FIG. 5 illustrates an image capture environment in which the user utilizes the image capture device, which is adhered to the adjustable receptacle apparatus based on the fastening process illustrated in FIGS. 4A-4D, to perform image capture of scenery.

FIG. 5 illustrates an image capture environment 500 in which the user 401 utilizes the image capture device 402, which is adhered to the adjustable receptacle apparatus 100 based on the fastening process illustrated in FIGS. 4A-4D, to perform image capture of scenery. In this particular instance, the user 401 is utilizing the handles 119 and 120 to navigate the image capture device 402. However, navigation of the image capture device 402, while adhered to the adjustable receptacle apparatus 100, may be performed without the handles 119 and 120 being attached to, or integrated within, the adjustable receptacle apparatus 100.

Figure 6:
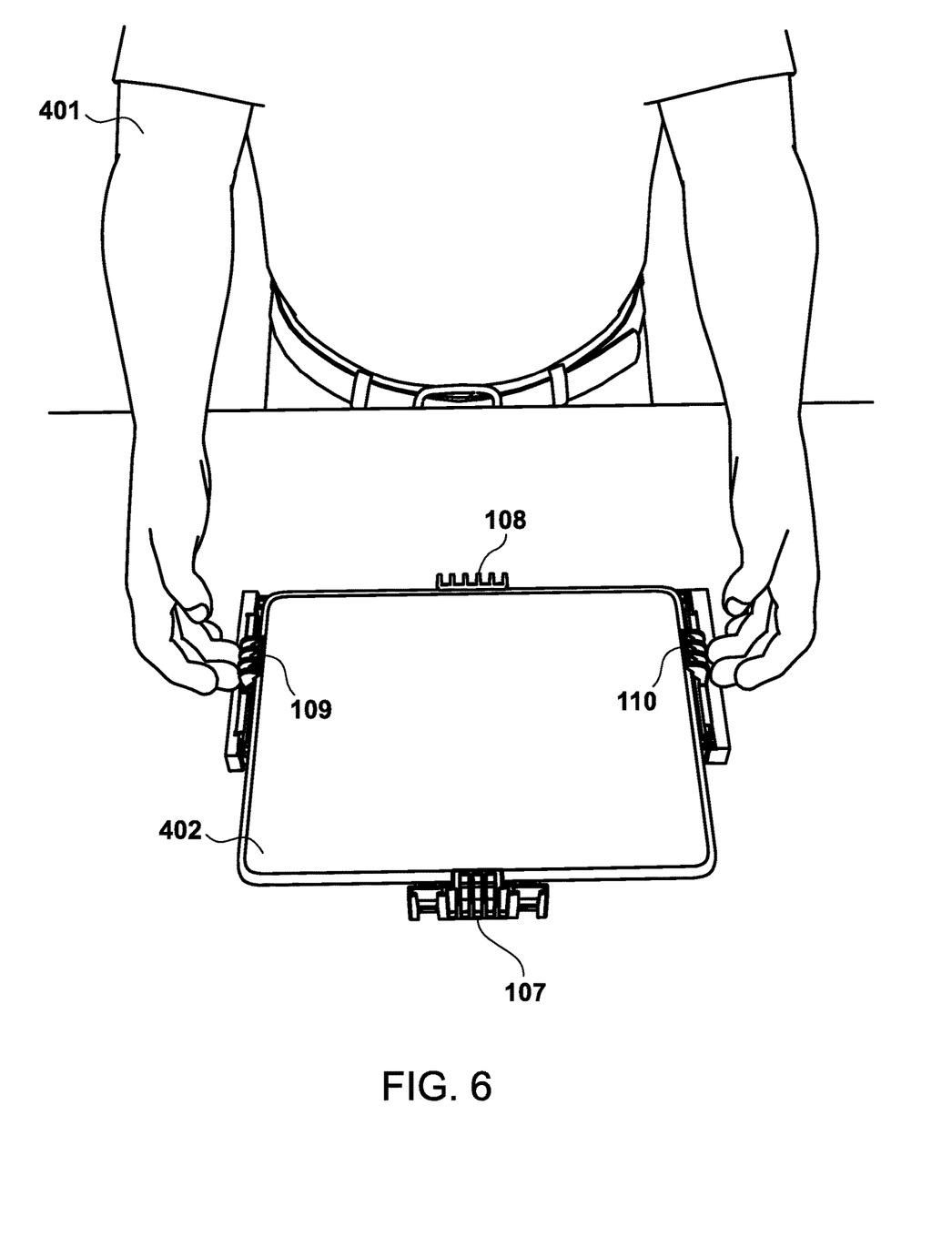
FIG. 6 illustrates the adjustable receptacle apparatus of FIGS. 1A and 1B without the handles.

FIG. 6 illustrates the adjustable receptacle apparatus 100 of FIGS. 1A and 1B without the handles 119 and 120. In particular, the user 401 may apply pressure to the various gripping members, such as the top-side gripping member 107, right-side gripping member 109, and/or left-side gripping member 110. As an alternative, the user 401 may also apply pressure to the bottom-side gripping member 108.

Figure 7:
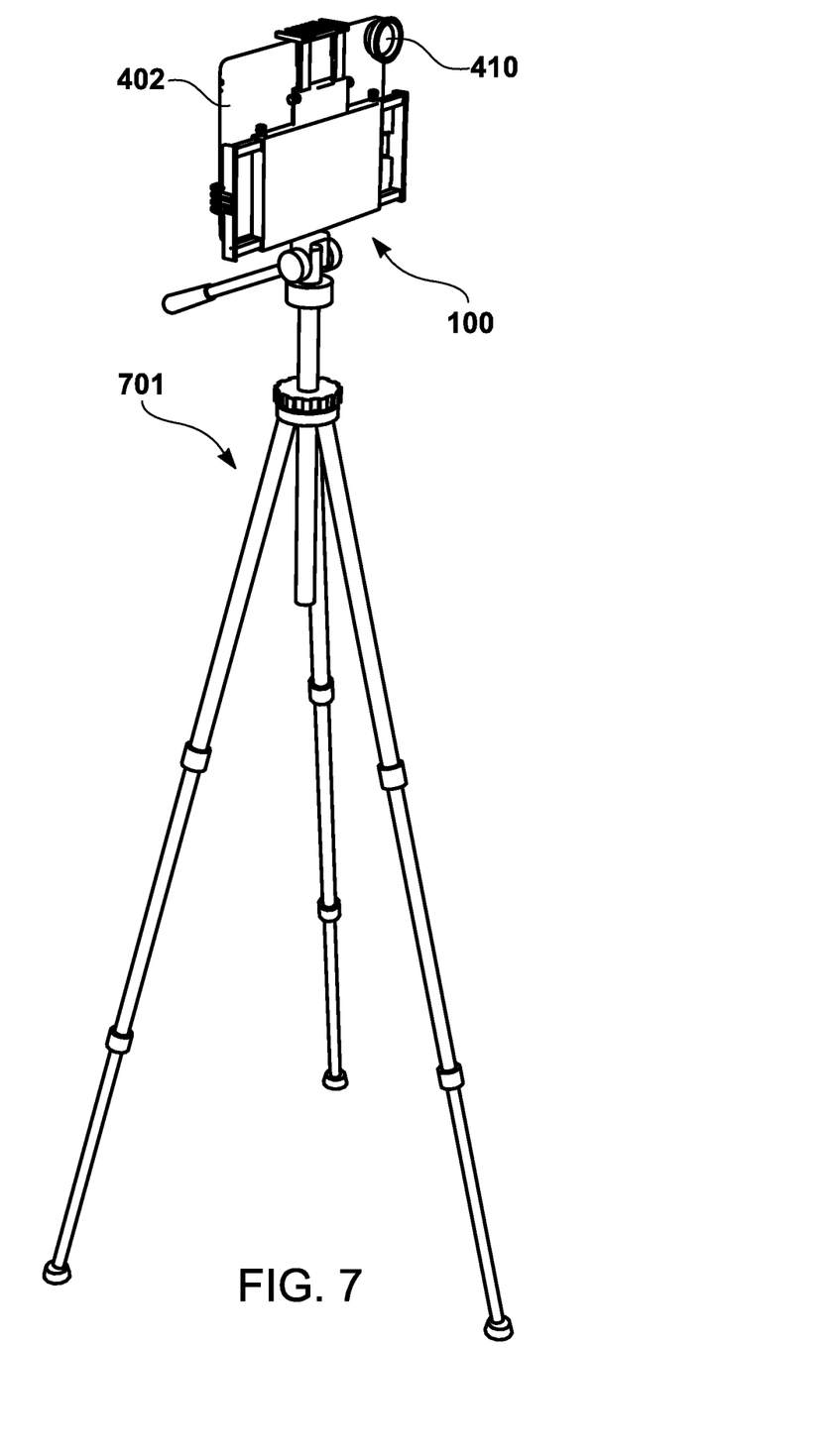
FIG. 7 illustrates the adjustable receptacle apparatus illustrated in FIG. 7 being used with a tripod.

Furthermore, FIG. 7 illustrates the adjustable receptacle apparatus 100 illustrated in FIG. 7 being used with a tripod 701. For instance, the tripod 701 may be attached to the adjustable receptacle apparatus 100 via the tripod connection device 121a, illustrated in FIGS. 1A and 1B.

Figure 8:
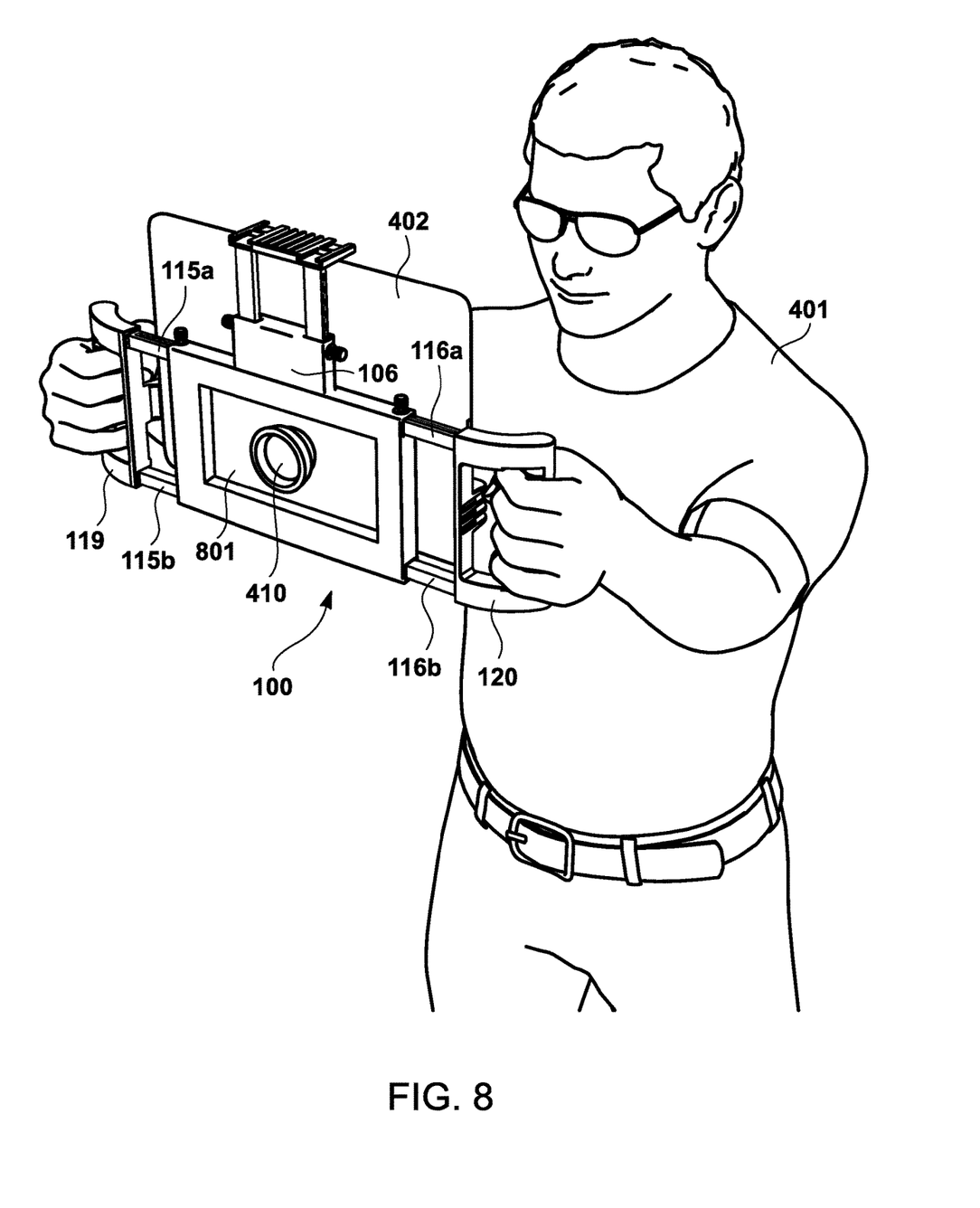
FIG. 8 illustrates the base plate having a cavity.

Although, the base plate 106 is illustrated in FIGS. 1A and 1B as being solid, it may have a cavity 801, as illustrated in FIG. 8. Accordingly, different or additional image capture devices 410 may be visible through the cavity 801 of the adjustable receptacle apparatus 100.

It is understood that the apparatuses described herein may also be applied in other types of apparatuses. Those skilled in the art will appreciate that the various adaptations and modifications of the embodiments of the apparatuses described herein may be configured without departing from the scope and spirit of the apparatuses. Therefore, it is to be understood that, within the scope of the appended claims, the present apparatuses may be practiced other than as specifically described herein.

We claim:

1. A receptacle apparatus comprising:
a top-side surface having an upward protruding flange;
a top-side gripping member that is operably attached to the upward protruding flange, the top-side gripping member being configured to grip a first portion of a tablet device to the receptacle apparatus, the top-side gripping member extending upward from a recess within the upward protruding flange;
a bottom-side surface;
a bottom-side gripping member that is operably attached to the bottom-side surface, the bottom-side gripping member being configured to grip a second portion of the tablet device to the receptacle apparatus;
a right-side surface;
a right-side gripping member that is operably attached to the right-side surface, the right-side gripping member being configured to grip a third portion of the tablet device to the receptacle apparatus;
a left-side surface;
a left-side gripping member that is operably attached to the left-side surface, the left-side gripping member being configured to grip a fourth portion of the tablet device to the receptacle device; and
one or more top-side fasteners that are configured to tighten the top-side gripping member to the tablet device, the one or more top-side fasteners being configured to move in a horizontal motion with respect to the top-side surface.

2. The receptacle apparatus of claim 1, further comprising a right handle that is operably attached to an extendable portion of the right-side surface that is operably attached to the right-side gripping member, the right handle extending rightward during extension of the right-side gripping member.

3. The receptacle apparatus of claim 2, further comprising one or more right-side fasteners that are configured to tighten the right-side gripping member to the tablet device.

4. The receptacle apparatus of claim 3, wherein the one or more right-side fasteners are configured to move in a vertical motion with respect to the right-side surface.

5. The receptacle apparatus of claim 1, wherein the right-side gripping member extends rightward from a recess within the right-side surface.

6. The receptacle apparatus of claim 1, wherein the bottom side gripping member extends downward from a recess within the bottom side.

7. The receptacle apparatus of claim 6, further comprising one or more bottom-side fasteners that are configured to tighten the bottom-side gripping member to the tablet device.

8. The receptacle apparatus of claim 7, wherein the one or more bottom-side fasteners are configured to move in a vertical motion with respect to the bottom-side surface.

9. The receptacle apparatus of claim 1, wherein the upward protruding flange is configured to contact a portion of the tablet device without contacting an image capture device integrated within the tablet device.

10. The receptacle apparatus of claim 1, wherein the top-side gripping member, the bottom-side gripping member, the right-side gripping member, and the left-side gripping member are fabricated from a flexible material that stretches to fit the tablet device within the receptacle apparatus.

11. The receptacle apparatus of claim 1, wherein the top-side gripping member, the bottom-side gripping member, the right-side gripping member, and the left-side gripping member are operated via one or more clip members.

12. A receptacle apparatus comprising:
a top-side surface having an upward protruding flange;
a top-side gripping member that is operably attached to the upward protruding flange, the top-side gripping member being configured to grip a first portion of a tablet device to the receptacle apparatus;
a bottom-side surface;
a bottom-side gripping member that is operably attached to the bottom-side surface, the bottom-side gripping member being configured to grip a second portion of the tablet device to the receptacle apparatus;
a right-side surface;
a right-side gripping member that is operably attached to the right-side surface, the right-side gripping member being configured to grip a third portion of the tablet device to the receptacle apparatus;
a left-side surface;
a left-side gripping member that is operably attached to the left-side surface, the left-side gripping member being configured to grip a fourth portion of the tablet device to the receptacle device, the left-side gripping member extending leftward from a recess within the left-side surface;
a left handle that is operably attached to an extendable portion of the left-side surface that is operably attached to the left-side gripping member, the left handle extending leftward during extension of the left-side gripping member; and
one or more left-side fasteners that are configured to tighten the left-side gripping member to the tablet device, wherein the one or more left-side fasteners are configured to move in a vertical motion with respect to the left-side surface.

* * * * *